(No Model.)
A. CUSTODIS.
ELECTRIC REGISTERING APPARATUS.
No. 543,336. Patented July 23, 1895.
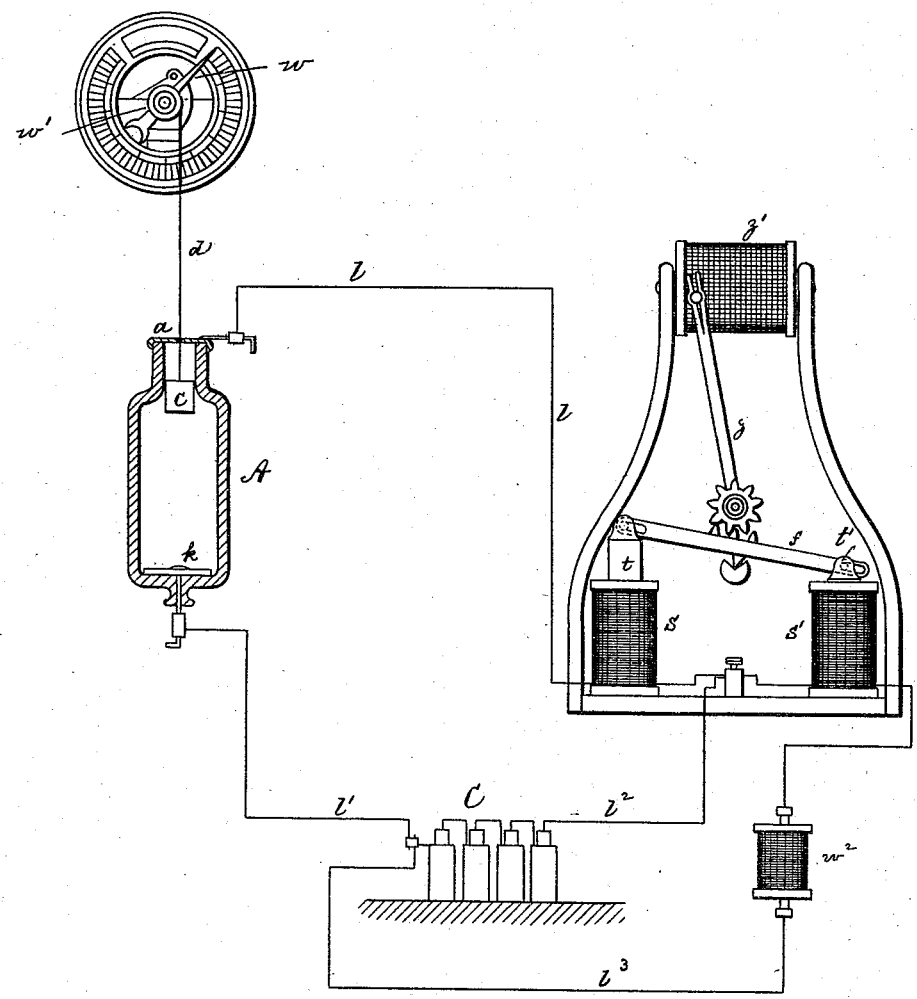

UNITED STATES PATENT OFFICE.

ALPHONS CUSTODIS, OF DUSSELDORF, GERMANY.

ELECTRIC REGISTERING APPARATUS.

SPECIFICATION forming part of Letters Patent No. 543,336, dated July 23, 1895.

Application filed March 19, 1895. Serial No. 542,329. (No model.)

*To all whom it may concern:*

Be it known that I, ALPHONS CUSTODIS, a subject of the German Emperor, residing at Dusseldorf, Germany, have invented certain new and useful Improvements in Electric Registering Apparatus, of which the following is a specification.

This invention relates to an apparatus for electrically indicating at a distance the position of a pointer, scale-beam, or other device, so as to notify the attendant of the existence of dangerous gases or of any other circumstance to which attention is to be drawn.

The drawing represents an elevation partly in section of my improved apparatus.

The letter $w$ represents a pointer, scale-beam, float, or other device, the movements of which are to be registered. This pointer carries a disk $w'$, upon which is wound the upper insulated end of a wire $d$, the lower end of which is exposed and carries a metal contact-piece $c$. This contact-piece is contained within a non-conducting vessel A containing acidulated water or other liquid, which is of course a poor conductor. The contact $c$ by wire $d$, contact $a$, and wire $l$, connects with a coil $s$. At its lower end the vessel A is provided with contact $k$, which connects by wire $l'$ with battery C, and thence by wire $l^2$ with coil $s$. A galvanometer may, if desired, be connected with the circuit. The current travels from battery C through wire $l'$ to contact $k$, through the liquid contents of vessel A to contact $c$, and goes from wire $d$ to contact $a$, wire $l$, coil $s$, and wire $l^2$, back to the battery.

As the water in vessel A is a poor conductor, it is clear that the distance between the contacts $k$ $c$ constitutes a resistance, and that the strength of the current depends upon the proximity of such contacts. Thus as the contact $c$ is raised or lowered by the motion of pointer $w$, the strength of the current is correspondingly reduced or increased. $s'$ is a second coil which is connected to the battery C by wires $l^2$ and $l^3$, of which the latter may contain a resistance or rheostat $w^2$ to regulate the power of the current. The coils $s$ $s'$ are hollow and contain the movable metal cores $t$ $t'$. These cores are connected to the pivoted scale-beam $f$, engaging the pointer $z$ that is adapted to mark upon a drum $z'$. It is plain that the relative strength of the currents in the coils $s$ $s'$ determines the inclination of the scale-beam $f$ and of the pointer $z$. Thus when the contact $c$ is raised, as indicated in the drawing, the current of the coil $s$ is weak, and consequently its core is raised so that the pointer inclines toward the left. If, on the other hand, the contact $c$ is lowered, the current passing through coil $s$ will predominate over the current passing through coil $s'$, and the pointer will incline toward the right.

The pointer may be provided with a pencil to register the variations of the apparatus upon a strip surrounding drum $z'$ and moved by clockwork. An alarm may, if desired, be sounded at the extreme positions of the pointer.

What I claim is—

An electric registering apparatus composed of a vessel, an inclosed suspended movable contact, a pair of coils of which one is connected to the contact and the other to a fixed resistance, a pointer controlled by the coil-cores and a battery, substantially as specified.

In testimony whereof I have signed this specification in the presence of two subscribing witnesses.

ALPHONS CUSTODIS.

Witnesses:
ERNESTINE ANDRÉ,
WILLIAM ESSEMREIN.